Aug. 28, 1945. J. A. MILLAR Re. 22,670
ASTRONOMICAL INSTRUMENT
Original Filed March 9, 1943
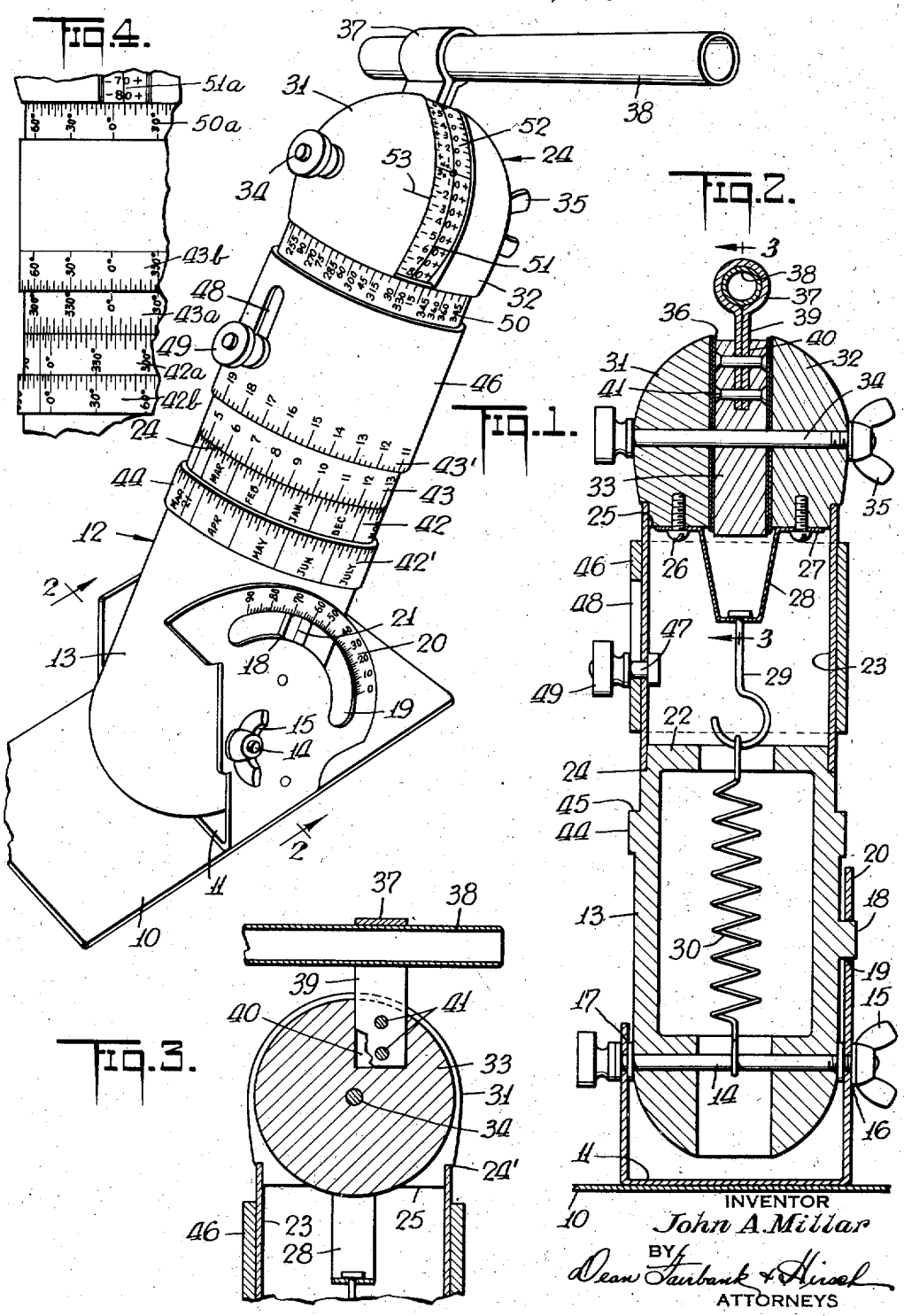
INVENTOR
John A. Millar
BY
Dean Fairbank & Hirsel
ATTORNEYS Reissued Aug. 28, 1945

Re. 22,670

UNITED STATES PATENT OFFICE 22,670

ASTRONOMICAL INSTRUMENT

John A. Millar, East Orange, N. J., assignor to Ruth G. Millar, East Orange, N. J.

Original No. 2,349,188, dated May 16, 1944, Serial No. 478,512, March 9, 1943. Application for reissue November 9, 1944, Serial No. 562,575

12 Claims. (Cl. 35—43)

The present invention is concerned with astronomical observation instruments and is an improvement upon that of the prior patent to T. T. Harvey No. 2,231,071 of February 11, 1941.

The instrument of the prior patent is inherently adapted for use in only one of the two hemispheres. For world-wide navigation two complementary instruments would therefore be required including one for the Northern and one for the Southern Hemisphere.

It is an object of the invention to provide an instrumentality of the above type of simple, rugged and inexpensive construction, which may be readily set to locate a star or constellation, or conversely to determine by reference to a said star or constellation the location of the observer and which is universal in that it may be used at any point on the face of the globe in the Northern or the Southern Hemisphere and without resort to elaborate tables and without the need for computation or the likelihood of error.

In the accompanying drawing in which is shown one of various possible embodiments of the several features of the invention, Fig. 1 is a perspective view of the instrument.

Fig. 2 is a view in longitudinal cross-section taken on line 2—2 of Fig. 1.

Fig. 3 is a transverse sectional detail view taken on line 3—3 of Fig. 2, and

Fig. 4 is a fragmentary perspective view of a modification.

Referring now to the drawing, the instrument involves a base 10 having an upstanding U-shaped bracket 11, desirably of sheet metal. Mounted between the legs of said bracket is a body 12 which includes a generally cylindrical holder cup 13 desirably of wood, but preferably of plastic, pivoted about a cross bolt 14 therethrough and retained in any position of angular setting by a wing nut 15 tightened through washer 16 against one arm of the bracket, friction washers 17 being desirably interposed between the holder and the sides of the bracket. A lug 18 in the side wall of the holder rides in an arcuate slot 19 in one side of the bracket, which has a latitude scale 20 thereon coacting with an index line 21 on the lug 18 and serving for convenient setting of the instrument to the latitude, determined in any convenient way as by shooting the Pole Star, the Southern Cross or other point of reference.

About the extremity 22 of the holder 13 is telescoped the lower end of a sleeve 23 which abuts against a peripheral shoulder 24 near the outer end of said holder. Upon the upper end of the sleeve 23 is lodged a head, preferably a generally spherical dome structure 24 the flattened lower end 25 of which is slightly reduced and fitted into the upper end of the sleeve 23 to afford a peripheral ledge 24' which rests firmly upon the upper end of the sleeve.

Affixed as by screws 26 to said flattened lower end are the wings 27 of a U-shaped sheet metal bracket 28 in the cross arm of which is mounted a swivel hook 29 to which is hooked the upper end of a coil spring 30, axially through the holder cup 13 and the lower end of which is anchored about the cross bolt 14, so that the dome is resiliently pressed against the upper end of the sleeve, but may be readily adjusted about the axis of the sleeve 23.

The dome is desirably of three pieces, including a pair of spherical segments 31 and 32 and an interposed disk or declination ring 33 diametrically thereof combined into a unitary structure by the transverse bolt 34 axially therethrough, a wing nut 35 thereon tightening the parts in any desired setting. The spherical segments and the ring are desirably of suitable plastic such as phenolic plastic. Preferably flexible disks 36 are interposed between the lateral faces of the declination ring and the spherical segments of the dome to minimize friction in adjustment, in the setting of the declination ring which turns in a plane at right angles to that in which the dome is turned. The declination ring is a complete disk which extends below the flat 25 of the dome and between the arms of bracket 28, the wings 27 of which are secured to spherical segments 31 and 32 respectively, as shown.

The declination ring carries a hanger 37 for accommodating a tube 38, small telescope or the like for convenience in shooting a star. The hanger is made of a sheet-metal strap which has the circular clamping portion 37 and the extremities 39 of which extend in superposed relation snugly into a corresponding slot 40 in the declination ring into which they are secured by a pair of rivets 41.

The uppermost exposed end of the holder 13 immediately below the sleeve 23 has a peripheral calendar scale 42 thereabout, the divisions of which run to the rim thereof, as shown. The abutting end of the sleeve 23 has an hour scale 43 thereabout, desirably running from zero to 24.

The holder 13 desirably has a peripheral rib 44 unitary therewith defining a peripheral ledge 45 at its top and immediately below the date scale 42. About the face of the peripheral rib 44 is another and complementary date scale 42′ which is thus on a slightly larger diameter than scale 42. The dates on scale 42′ run counterclockwise when viewed from the top, while those on the upper scale 42 run clockwise and the winter solstice date December 21 on each scale registers with the summer solstice date June 21 on the other scale.

Encompassing the sleeve 23 is a collar 46 which is affixed to the sleeve to permit it to be slid longitudinally therealong, but to prevent rotary displacement relative thereto. For that purpose, the sleeve desirably is equipped with a bolt 47 protruding through a slot 48 longitudinally of the collar and a nut 49 about the stud serves to lock the collar either in its uppermost position as shown in Fig. 1, with the stud engaging the lower end of the slot 48, or in lowermost position in which the collar abuts the peripheral ledge 45 at the top of the lower scale 42′. About the lower end of the collar 46 is an hour scale 43′ desirably running up to 24, which is complementary to hour scale 43 on the sleeve 23, that is to say, the progression of hours thereof is clockwise when viewed from the top of the instrument, whereas that on the sleeve is counterclockwise and the sum of each registering pair of numerals on the two hour scales is 24.

About the extreme upper end of the sleeve 23 is an hour angle scale 50 by which the dome may be set for sidereal hour angle, by reference to the median peripheral line 51 about the declination ring 33. The hour angle scales are desirably in two sets as shown, one from zero to 360 degrees peripherally about the sleeve in clockwise and the other in counterclockwise direction.

On the declination ring 33 is a scale desirably imprinted on a band 52 thereabout, for setting or reading of declination, by reference to an index line 53 on the equator of the dome.

Preferably the calendar scale 42 and the associated hour scale 43 are imprinted in black. The complementary scales, that is, the lower calendar scale 42′ and the hour scale 43′ on the collar 46 are of contrasting color such as red.

The hour angle scale readings 50 that correspond to the hour scale 43 are likewise printed in black and the complementary scale that corresponds to hour scale 43′ is in red. The scales in black serve for readings in the Northern Hemisphere and those in red for the Southern.

Similarly the scale readings on the declination ring are in two sets from zero to 90, and each has associated plus and minus marks to designate positive or negative declination, designated in black at one side and in red at the other for use respectively in the Northern and Southern Hemispheres.

The manner of use of the instrument will be apparent from the above description and need be but briefly set forth. The clamp 37 which is located at the 90 degree scale division of the declination scale 52 will be pointed to the pole star when the index line 21 is set to the correct latitude. The sleeve 23 is then turned to bring the local time read on the lower time scale 43 thereof into registry with the date on the associated calendar ring 42. The dome 24 is then turned to the sidereal hour angle or right ascension of the constellation or star of reference, and the declination ring 33 is adjusted to the declination of such star, whereupon such star or constellation is located through tube 38. Conversely, when a given star is identified and its declination and its right ascension are known from a table the latitude and longitude may be readily determined by use of the instrument.

Upon crossing the equator, the instrument may be immediately converted for use in the Southern Hemisphere by simple adjustments. Nut 49 is loosened to lower the collar 46 for covering the black time ring 43 and the black date ring 42 so that the collar 46 rests upon the peripheral ledge 45, and the complementary or red time scale 43′ is now in juxtaposition to the complementary or red date scale 42′. The declination ring is turned until the diameter of tube 38 is reversed so that the Southern Cross rather than the pole star may be used as the point of reference. The instrument is now used exactly as above described except that only the red scales or the red symbols are used. Only the red calendar scale 42′ and the red time scale 43′ are now exposed for use. The set of red hour angle readings on scale 50 now serve for right ascension readings. The red plus or minus symbols in connection with the readings on the scale 52 now serve for making declination readings.

The embodiment of Fig. 4 shows in perspective view a fragment merely, of an instrument identical in construction with that in Figs. 1 to 3, but having a different system of scale markings, which renders the device especially useful for navigation purposes.

Instead of the calendar scale 42 of Fig. 1, there is employed an angle scale $42^a$ (0 degrees to 360 degrees) with the zero line corresponding to that for March 21 on the embodiment of Fig. 1. The complementary calendar scale 42′ of Fig. 1 is replaced by the complentary angle scale $42^b$ which like scale 42′ runs in reverse direction.

The hour scale 43 of Fig. 1 is replaced by an angle scale $43^a$ (0 to 360 degrees) and the complementary hour scale 43′ of Fig. 1 is replaced by a complementary angle scale $43^b$, which like scale 43′ runs in reverse direction.

The scale 50 at the upper end of the sleeve in Fig. 1 is replaced by a longitudinal angle scale $50^a$, the zero marking of which is aligned with the zero marking on the scales $43^a$ and $43^b$, and the scale markings of which run to 180 degrees in each direction. The declination scale $51^a$ is identical with scale 51 of Fig. 1.

In use of instrument of Fig. 4, a navigator equipped with the usual American Air Almanac, the Ephemeris or the Nautical Almanac and also with a clock showing Greenwich time, can readily determine his position to within one degree of longitude. For this purpose, the latitude is determined by shooting the Pole Star and is read from the latitude scale. The sidereal hour angle of any selected star or planet is determined from the Almanac or Ephemeris for the date at the particular Greenwich time read on the clock. The angle on scale $43^a$ is set into registry on scale $42^a$ with the Greenwich hour angle of Aries, which is also determined from the Almanac or Ephemeris. The declination ring is set for the declination of the selected star and the dome is turned about scale $50^a$ until that star may be shot through the tube. The longitude is then immediately read upon the scale $50^a$.

As many changes could be made in the above construction, and many aparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. A universal astronomical instrument comprising a base having a bracket, a generally cylindrical body having a horizontal pivot mount in said bracket for latitude adjustment in a vertical plane, the upper end of said body having a rotary dome adjustable about the axis of the body, an associated scale therebelow, said dome including a declination ring adjustable in a plane at right angles to that for adjusting the dome, said cylindrical body having a first scale thereabout, and including a rotatable sleeve having a second scale thereabout and adjoining said first scale, a collar encompassing said sleeve and having a scale thereabout complementary to that on the sleeve, said collar being affixed with respect to said sleeve for rotary displacement in unison therewith but longitudinally slidable thereon, said collar in one setting exposing the scale on the body and the associated scale on the sleeve and in the other adjustment concealing said scales, and a scale about said body complementary to the first scale and coacting in the latter adjustment with the scale on the collar.

2. The combination recited in claim 1 in which the scales on the cylindrical body are calender scales and the scales on the lower end of the sleeve as well as those on the collar are hour scales.

3. The combination recited in claim 1 in which each scale of the two sets of complementary scales is an angle scale.

4. A universal astronomical instrument comprising a base and a generally cylindrical body having a peripheral ledge near the top thereof, said body including a cylindrical mounting holder pivotally mounted on said base for latitude adjustment thereof, a sleeve telescoped upon the upper end of said holder and abutting said ledge, and a dome protruding from and telescoped at its lower part into the upper end of said sleeve and mounted for rotary setting thereof, said dome including a diametral rotarily adjustable declination ring, said holder and said sleeve having coacting scales respectively about their abutting ends, a collar encircling said sleeve and mounted for rotary displacement therewith, but longitudinally adjustable thereon, said collar having a scale about one edge thereof complementary to that on said sleeve, and said holder having a scale thereabout coacting therewith and complementary to the first mentioned scale thereabout, said collar in one position thereof exposing the first mentioned coacting scales and in the other position thereof disposing the other pair of scales in juxtaposition while covering the first set of scales.

5. The combination recited in claim 4 in which a bolt affixed in the cylinder extends through a slot longitudinally in the collar, and mounts a nut for clamping the collar with the bolt engaging the lower end of the slot in one extremity and the upper end of the slot in the other extremity.

6. A universal astronomical instrument comprising a cylindrical mounting holder having a pair of complementary scales thereabout, the upper scale being on a slightly smaller diameter than the lower scale to define a peripheral ledge therebetween, a sleeve telescoped over the upper extremity of said holder and abutting at its lower end against the upper scale and having a scale thereabout coacting with said upper scale, a collar encircling said sleeve and affixed with respect thereto for rotary adjustment therewith, and means connecting said collar to said sleeve to permit longitudinal displacement of said collar along said sleeve to abut said peripheral ledge for juxtaposition to the lower scale and for concealment of the upper scale and its associated scale, said collar having a complementary scale near its lower edge coacting with the lower scale.

7. A universal astronomical instrument comprising a base, a generally cylindrical body pivotally mounted thereon for latitude adjustment, said body including a cylindrical holder and a coaxial sleeve rotarily adjustable thereabout for date setting, and a dome coaxial with and rotarily adjustable about the upper end of the sleeve for right ascension setting, said dome having a declination ring rotarily adjustable diametrically thereof for declination setting, said body having complementary sets of date and hour scales for use respectively in the Northern and Southern Hemispheres and including means for concealing one set of said scales when the other set is in use, a pair of complementary hour angle scales about the upper end of the sleeve and a pair of complementary declination scales about the declination ring for use respectively in the Northern and Southern Hemispheres.

8. A navigation instrument comprising a base, a generally cylindrical body pivotally mounted thereon having latitude adjustment, said body including a cylindrical holder having a Greenwich hour angle scale thereabout and a coaxial sleeve rotarily adjustable thereabout, having a sidereal hour angle scale thereabout at its lower end coacting with that on said body, the upper end of said sleeve having a longitudinal angle scale thereabout, a dome coaxial with and rotarily adjustable about the upper end of the sleeve, said dome having a declination ring rotarily adjustable diametrically thereof.

9. The combination recited in claim 8 in which the sleeve has a collar thereabout affixed with respect thereto for rotary adjustment therewith and longitudinal displacement thereof along said sleeve, said collar having a sidereal hour angle scale at the lower edge thereof complementary to that on said sleeve, said body having a second Greenwich hour angle scale thereon complementary to and adjacent the other Greenwich hour scale thereon.

10. A universal astronomical device having a base, a cylindrical body, a pivot bolt therethrough mounting said body for adjustment thereof in a vertical plane for latitude setting, said body having a hollow cylinder, a dome protruding from the upper part of said cylinder and having a flattened lower part within said cylinder, a bracket affixed to said flattened part and within said cylinder, said bracket having a hook at the lower end thereof, and a coil spring connecting said hook to said pivot bolt, said dome comprising a pair of spherical segments and an intervening declination ring, and a transverse bolt holding said latter parts assembled, said ring having a hanger affixed therein affording a socket for accommodating a pointer.

11. The combination recited in claim 10 in which the hanger comprises a strap presenting a collar for gripping a pointer, the ends of said strap being in superposed relation, extending into a corresponding cavity in the declination ring and being riveted in place therein.

12. A navigation instrument comprising a base, a body pivotally mounted thereon having latitude adjustment, said body including a part having a Greenwich hour angle of Aries scale thereabout at one extremity thereof, and a coaxial member rotarily adjustable thereabout having a sidereal hour angle scale thereabout contiguous to and co-acting with said Greenwich hour angle of Aries scale on said body, the other extremity of said member having a longitudinal scale thereabout, a head with a declination scale coaxial with and rotarily adjustable about the longitudinal scale of said member, said head having a sighting device rotarily adjustable diametrically thereon.

JOHN A. MILLAR.